L. Soehlmann,
Pepper Caster,

No. 58,312. Patented Sept. 25, 1866

Witnesses;

Inventor;
Louis Soehlmann

UNITED STATES PATENT OFFICE.

LOUIS SOEHLMANN, OF JERSEY CITY, NEW JERSEY.

IMPROVED PEPPER-CASTER.

Specification forming part of Letters Patent No. 58,312, dated September 25, 1866.

*To all whom it may concern:*

Be it known that I, LOUIS SOEHLMANN, of Jersey City, in the county of Hudson and State of New Jersey, have invented a new and useful Improvement in Pepper-Casters; and I do hereby declare the same is fully described and represented in the following specification and the accompanying drawings, of which—

Figure 1:
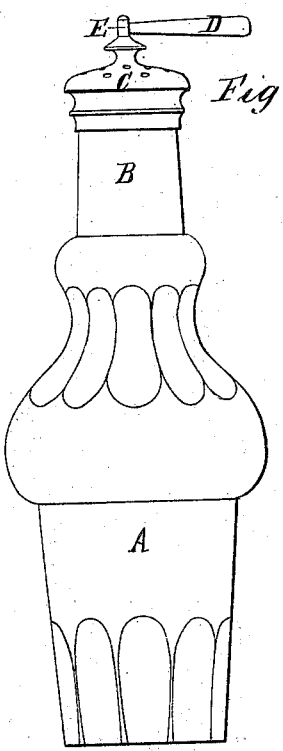
Figure 2:
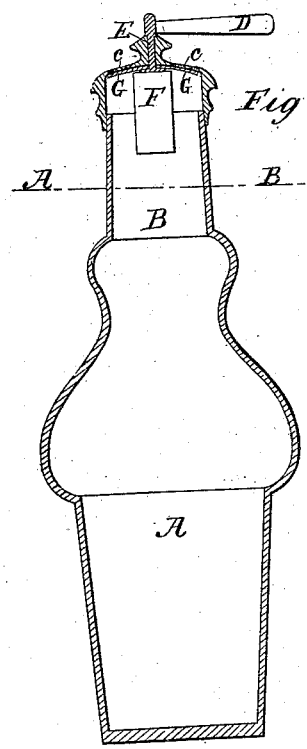
Figure 3:
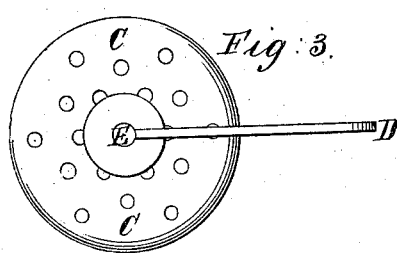
Figure 4:
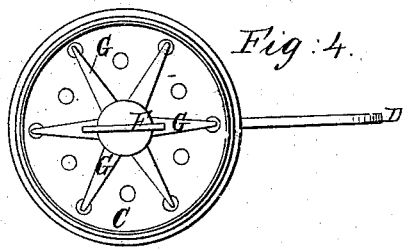

Figure 1 is an elevation of a caster with my invention applied to it. Fig. 2 is a vertical section; Fig. 3 a top view, and Fig. 4 a transverse section on *a b*, enlarged and exhibiting my invention as inverted.

This invention relates to a new device applied to a pepper-caster, which consists of a lever or finger-bar placed on the outside of the perforated top or riddle of the caster, and is connected by a shaft with a series of arms on the inside of the perforated cap, for the purpose of agitating the pepper or salt in the neck of the caster, as well as for removing any of the same that may accumulate or become congealed in or about the holes of the perforated cap, thus rendering the caster at all times free to cast the desired amount of pepper, salt, &c., on the edibles with ease and convenience.

Having described the nature of my invention, I will now describe its construction and mode of operation.

In the drawings, A represents an ordinary caster; B, the neck of the same; C, the perforated top or riddle; D, a finger-bar, connected by a shaft, E, with a fan, F, and with a series of wipers or arms, G G, &c. The shaft E passes through the head of the caster and revolves freely therein, carrying with it the fan F and wipers G G, &c., for the purpose of agitating the ingredients in the neck of the caster, and removing any that may accumulate in the said neck.

The operation of my invention, being very simple, is as follows: When the pepper or salt, on absorbing the vapor thrown off from the surrounding fluids and edibles, becomes clotted or congealed in the neck of the caster, by merely revolving the finger-bar the fan and wipers will also revolve with it, (the finger-bar,) and by their means the congealed ingredients will be removed from the riddle or perforated cap and agitated so as to leave the riddle always free to cast the pepper or salt on the edibles, thus rendering my invention of great convenience and utility.

Having described my invention, what I claim, and desire to secure by Letters Patent, is—

The finger-bar D, the fan E, and the series of wipers G, when in combination with a pepper-caster, A, substantially as and for the purposes described.

In testimony whereof I have hereunto set my signature.

LOUIS SOEHLMANN.

Witnesses:
PHILIPP FRANZ,
A. NEILL.